US 6,655,467 B2

(12) United States Patent
Pfisterer

(10) Patent No.: US 6,655,467 B2
(45) Date of Patent: Dec. 2, 2003

(54) APPARATUS FOR CLEARING AND GROOMING GROUND

(76) Inventor: James W. Pfisterer, 205 Country Day Rd., Chester, MD (US) 21619

( * ) Notice: Subject to any disclaimer, the term of this patent is extended or adjusted under 35 U.S.C. 154(b) by 0 days.

(21) Appl. No.: 10/077,882

(22) Filed: Feb. 20, 2002

(65) Prior Publication Data

US 2003/0155139 A1 Aug. 21, 2003

(51) Int. Cl.⁷ .......................... A01B 45/00; A01B 45/02
(52) U.S. Cl. ................................................. 172/22
(58) Field of Search ........................ 172/21, 22, 554; 171/DIG. 2, 114, 116, 120; 56/16.4 A, 16.4 B, 16.4 D, 502, 294; 37/387, 270, 253, 254

(56) References Cited

U.S. PATENT DOCUMENTS

| | | | | |
|---|---|---|---|---|
| 1,189,016 A | * | 6/1916 | Thompson | 15/83 |
| 2,964,204 A | * | 12/1960 | Wilson | 414/439 |
| 3,587,814 A | * | 6/1971 | Garabedian | 198/309 |
| 3,593,868 A | * | 7/1971 | Folz | 414/440 |
| 4,878,802 A | * | 11/1989 | Hansen et al. | 414/523 |
| 5,178,221 A | * | 1/1993 | Hamawaki et al. | 172/22 |
| 5,417,538 A | * | 5/1995 | Wilde | 414/440 |
| 6,098,387 A | * | 8/2000 | Pfisterer | 56/16.4 R |

* cited by examiner

Primary Examiner—Árpád Fábián Kovács
(74) Attorney, Agent, or Firm—Dennison, Schultz & Dougherty

(57) ABSTRACT

A ground clearing machine including a mobile frame with a vertically adjustable support frame mounted thereon and mounting a ground clearing implement for vertical adjustment therewith, the implement including shaft mounted rotatable tines within a semi-circular drum with a downwardly opening mouth for both receiving and discharging debris with the debris pulverized within the drum between the intake and discharge thereof.

18 Claims, 5 Drawing Sheets

APPARATUS FOR CLEARING AND GROOMING GROUND

BACKGROUND OF THE INVENTION

Ground maintenance or grooming of golf courses has become increasingly specialized, requiring equipment particularly adapted to meet the exacting requirements of a properly maintained golf course.

Attention is directed to applicant's prior U.S. Pat. No. 6,098,387, issued Aug. 8, 2000, which relates to apparatus particularly adapted for use on the greens of a golf course for the clearing of the green of cut plugs, thatch, thatch balls, and the like, resulting from previously performed aerating and fertilizing steps. While such equipment has been highly effective in the care of greens, recent attention has also been directed toward a more controlled maintenance of fairways and roughs. This has included the cutting of plugs as large as 1"×12" in the roughs. These plugs are cut in grass which is about 3½" high, and as such, the known prior art equipment has been found to be incapable of gathering and destroying the cut plugs. Rather, it has been necessary, when operating in roughs and on fairways, to sweep the plugs, use some form of drag equipment, or even manually pick up the plugs with the gathered plugs hauled away. Such practices are both difficult and involve high labor costs. Further, such procedures physically remove the dirt, along with nutrients which have accumulated therein due to fertilization and natural replenishment by the growing grass.

SUMMARY OF THE INVENTION

The present invention is directed to ground clearing apparatus which is specifically intended for use on golf courses and is particularly adapted to the varying ground conditions normally encountered. As such, the machine of the invention, while operable as a core clearing device for greens, is equally adapted to perform corresponding ground clearing functions on both fairways and roughs where the grass may be as much as 3½" high and the extracted cores as much as 1"×12". In this manner, the machine of the invention readily accommodates to changing golf course maintenance procedures wherein complete ground aeration and deep fertilization, as by the removal of plugs or cores, is no longer limited just to the greens, but has been extended to the fairways and roughs.

While the main function of the machine is to effect removal, pulverization and redistribution of cut cores, thatch, and other ground debris, it is also contemplated that the machine, through minor adjustments specifically provided for, act as an effective means for scarifying the soil as a preliminary step in reseeding. This procedure will usually be utilized on the fairways with the soil preparation normally timed for fall reseeding. As such, the machine of the invention is actually a multi-purpose apparatus which can effectively perform different tasks in a manner which significantly reduces both labor and equipment costs.

The operating unit of the invention, that is the unit which accepts, pulverizes and redistributes the ground debris, comprises a plurality of blades with rigid spaced tines fixed to and arranged in offset rows about the circumference of a driven shaft which operates within a partial shield or drum open about the lower periphery thereof for the reception of the debris and the rearward discharge of the pulverized material. This operating unit includes a lower removably mounted strike plate which cooperates with the blade tines in engaging and lifting the debris while protecting the ground surface. Provision is made for vertically adjusting the operating unit which, in conjunction with a removal of the strike plate, allows for actual scarifying contact of the tines with the ground.

The entire operating unit mounts on a vertically adjustable support frame which provides for a vertical adjustment of the operating unit for the accommodation of specific ground conditions and more particularly grass heights as will vary between fairways and roughs. The range of vertical adjustment is such as to allow for a complete retraction of the operating unit from ground contact as the machine is moved from one work area to another.

The vertically adjustable frame is mounted on a mobile frame preferably provided with large pneumatic wheels which are particularly adapted to accommodate soft or wet ground conditions. The machine, or more particularly the mobile wheeled frame, will preferably mount laterally to one side of the towing vehicle, and is so hitched to the towing vehicle as to allow for a floating action relative thereto to accommodate any encountered ground irregularities or differences in elevation between the towing vehicle and the mobile frame. The lateral offsetting is considered significant in that the towing vehicle is positioned to avoid a running of this vehicle over the plugs and ground debris prior to pickup. This is important in that, as an example, in working a wet surface, the running of the vehicle over the plugs will effectively embed the plugs into the grass, making their removal extremely difficult.

Other features, details, and advantages of the machine of the invention will become apparent as the invention is more fully hereinafter described.

DESCRIPTION OF PREFERRED EMBODIMENTS

Figure 1:
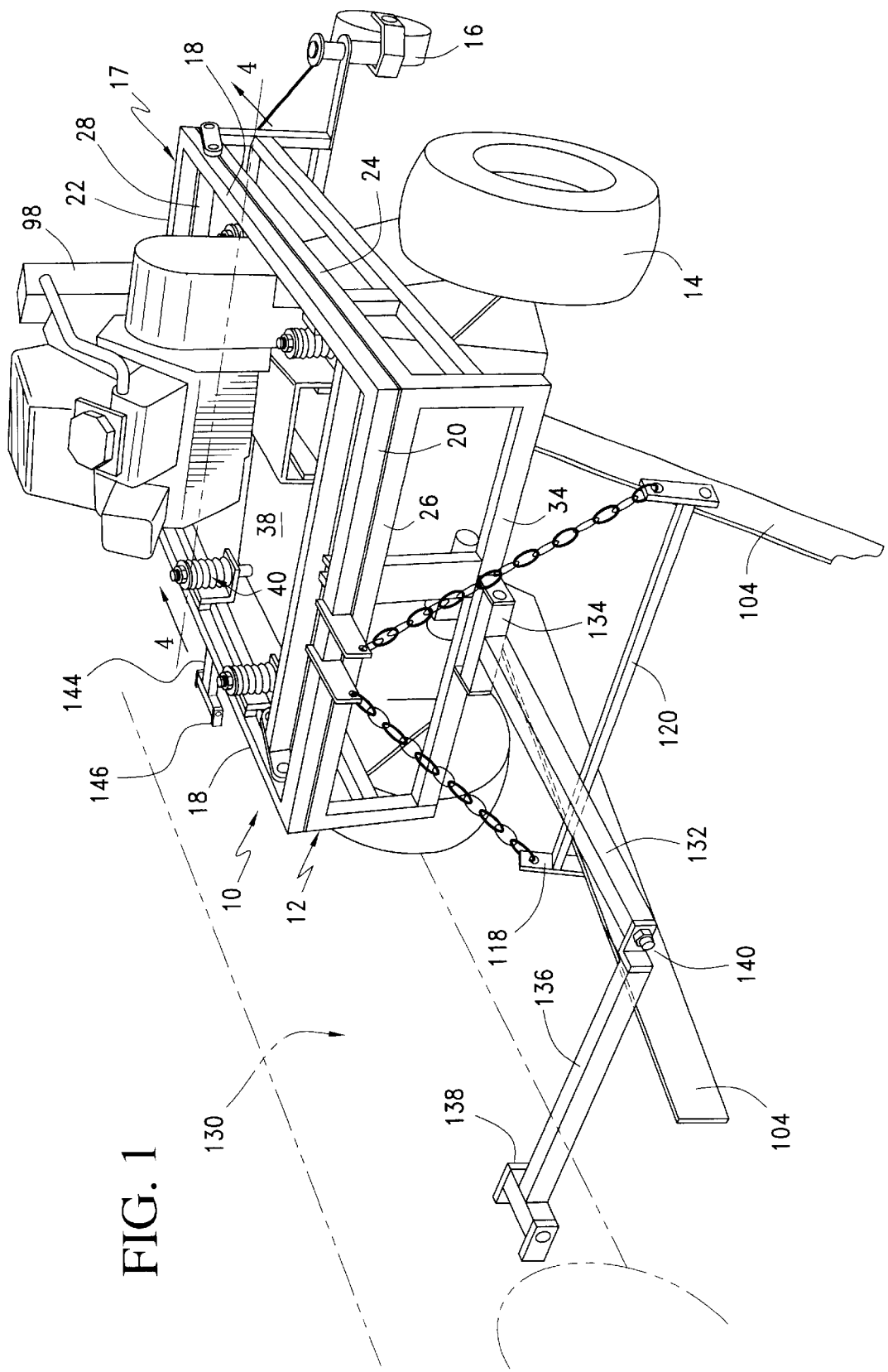
FIG. 1 is a perspective view of the ground clearing machine in its lowered operative position.

Referring now more specifically to the drawings, the ground clearing machine 10 includes a ground engaged mobile frame 12 supported on two forward large pneumatic wheels 14 positioned to take 90% of the weight of the machine, and two rear smaller caster wheels 16. A vertically adjustable support frame 17 overlies the mobile frame 12 and is vertically adjustable relative thereto. Both frames are preferably formed of welded hollow rectangular beams to provide the desired structural stability while minimizing weight.

The support frame is basically rectangular with opposed side beams 18, a front beam 20 and a corresponding rear beam 22. The upper beams of the mobile frame similarly include opposed side beams 24 and both front and rear beams 26 and 28.

Vertical adjustment of the support frame relative to the underlying mobile frame is effected in any appropriate manner, for example, as illustrated, by a screw jack unit 30 controlled by a reversible electric motor 32. The jack, as suggested in FIGS. 2 and 3, will engage between a lower frame beam 34 on the mobile frame, generally along the transverse center thereof, and the forward beam 20 of the support frame. In order to control and stabilize the support frame during vertical adjustment, four elongate parallel links 36 are engaged between the upper side beams 24 of the mobile frame and the side beams 18 of the support frame. Each of these links has a first end pivotally mounted to the beams 24 and a second end mounted to the beams 18 with the length of the links 36 determining the degree of vertical adjustability between the mobile frame and the overlying support frame. As noted, and for additional stability, the forward links 36 can mount to the inner faces of the respective side beams while the rear links mount to the outer faces.

A flat transverse support deck 38 is positioned between and below the support frame side beams 18 generally centrally between the front and rear beams 20 and 22 thereof. This support deck 38 is supported by four coil spring mounts 40 at approximately the four corners thereof, the mounts 40 include four angle brackets welded to the inner faces of the side beams 18. The coil springs 42 themselves, as illustrated, will sit on the horizontal legs of the brackets. Central rods 44, having lower ends welded or otherwise fixed to the deck 38, extend vertically through the bracket legs and springs 42, and have adjusting nuts 46 on the upper ends thereof engaging the springs for varying the degree of compression on the springs, thus providing for an adjustment in the response of the deck, and the operating components thereon, to variations in ground conditions encountered as the machine travels along its operating path.

Figure 4:
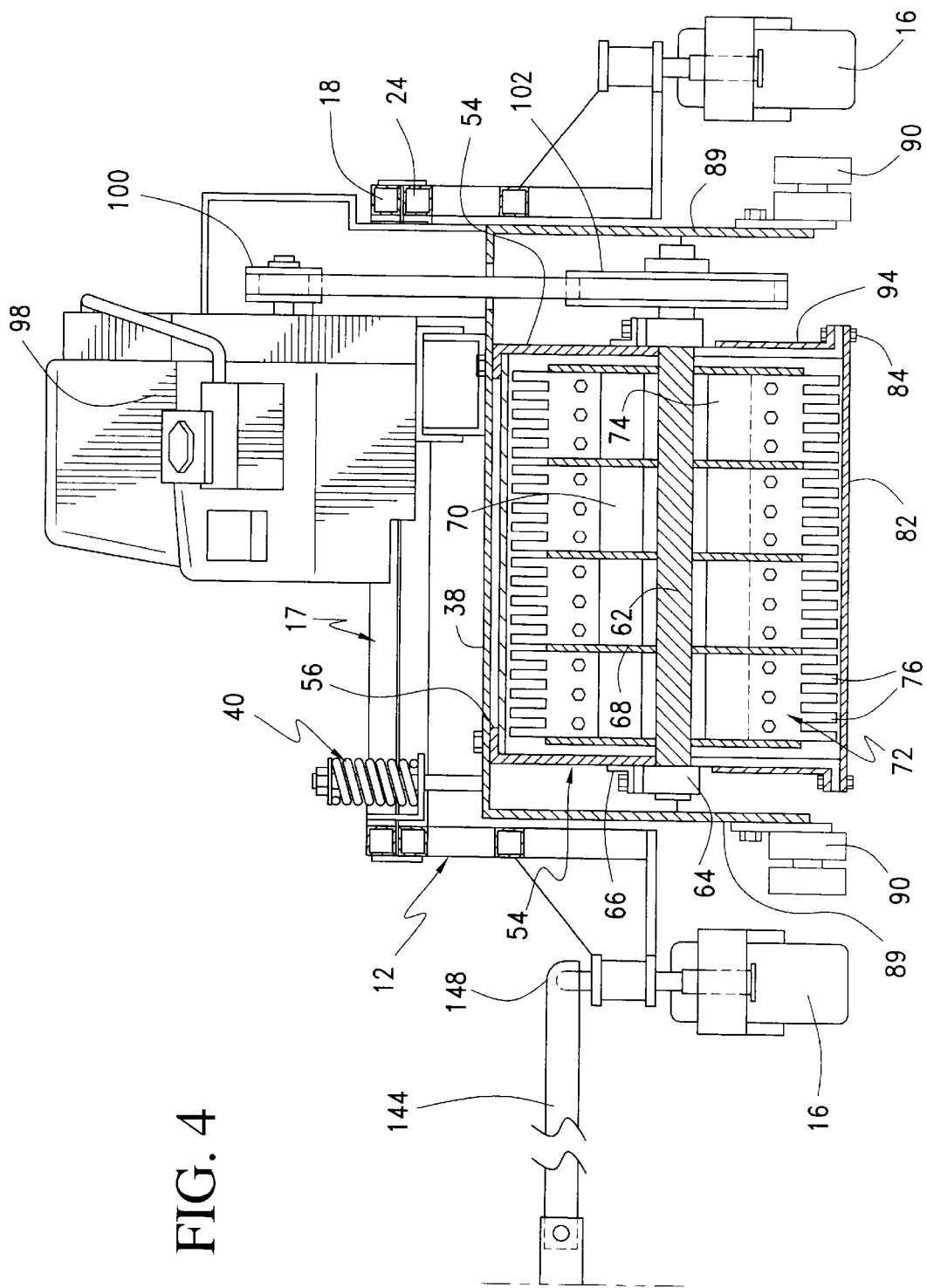
FIG. 4 is an enlarged transverse cross-sectional view taken substantially on a plane passing along line 4—4 in FIG. 1.

An elongate cylindrical or semi-cylindrical drum 50 underlies the top deck 38 and extends longitudinally therealong. This drum 50 is bolted, as at 52, or otherwise rigidly joined to a pair of end panels 54. The end panels 54 have laterally directed upper flanges 56 which engage against and are bolted or otherwise affixed to the overlying deck 38, note FIG. 4.

The actual clearing implement or unit 60 includes an elongate driven shaft 62, the opposite ends of which extend through the opposed end panels 54 and rotatably mount within bearings 64 bolted to overlying brackets 66 affixed to the external faces of the panels 54. The shaft has a plurality of circular plates 68 welded thereto at spaced points therealong, including opposed end plates immediately inward of the side panels 54. These circular plates 68 in turn mount a series of longitudinally extending circumferentially spaced mounting plates 70 therebetween and preferably welded thereto. These mounting plates 70 are provided in longitudinally aligned rows with the rows spaced circumferentially about the shaft 62 with the plates 70 having outer edges generally aligned with the outer peripheral edge of the circular plates 68 and inner edges spaced radially outward of the shaft 62.

Figure 5:
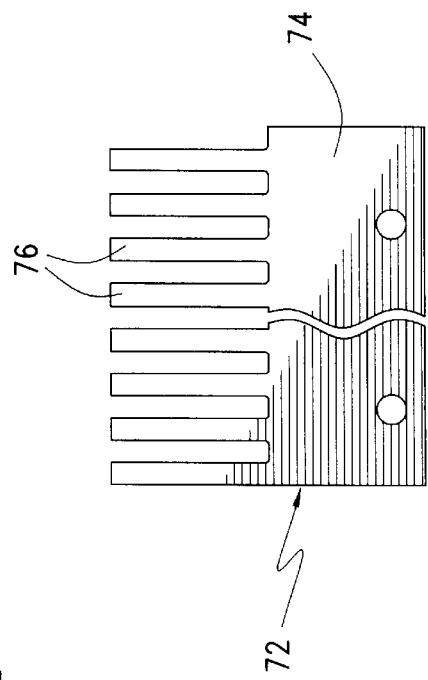
FIG. 5 is a plan view of one of the clearing implement blades.

Each mounting plate 70 has a rigid clearing blade 72 bolted thereto with the blades aligned in rows circumferentially spaced about the shaft 62. Each blade, noting FIG. 5 in particular, includes a rectangular base 74 which overlies the corresponding mounting plate 70 and is bolted thereto. In addition, each blade 72 includes, integral with the base 74 and extending coplanar therewith, a series of elongate spaced rigid tines or fingers 76 which, upon a mounting of the blades 72, extend beyond the mounting plates 70 and constitute the actual ground working elements. As will be noted in FIG. 5, one end tine corresponds to the corresponding side edge of the blade while the opposite end tine is inwardly offset from the corresponding edge a distance approximately equal to the spacing between the tines. Thus, by reversing the blades 72 in alternate rows about the clearing implement, the blade tines in each row will be offset from the blade tines in the adjacent rows, giving a more complete coverage and a more effective operation on the encountered ground materials, whether this be for debris pickup or ground scarification.

Noting FIGS. 2 and 3 in particular, it will be seen that the blade tines lie closely adjacent the inner cylindrical surface of the drum 50 to ensure the desired degree of debris pulverization as shall be discussed subsequently. In this regard, it is to be appreciated that the tines are rigid and the drum generally imperforate throughout approximately the upper one-half thereof so as to achieve the desired pulverizing action.

The actual intake of the solid debris and the discharge of the pulverized debris is achieved through a single downwardly directed mouth defined by terminating the drum at a first forward edge 78 and at a second rear edge 80, the forward edge 78 being lower, that is relative to ground level, than the rear edge 80.

A removable full length strike plate 82 is removably bolted, as at 84, to laterally turned flanges on the side panels 54 supporting the drum 50. This strike plate 82 is positioned in close proximity to the outer ends of the blade tines 76, the distance therebetween being approximately the distance between the tines and the inner cylindrical surface of the drum. Further, and as will be appreciated from the cross-sectional views of the drawings, the strike plate 82 extends principally forward of the vertical center line of the implement as defined by the shaft 62. Thus positioned, the strike plate divides the downwardly opening mouth of the drum, formed by the forward and rear edges 78 and 80, into a forward intake section or portion 86 and a rear discharge section or portion 88. The strike plate cooperates with the blades in engaging and raising the debris, and also prevents accidental engagement of the tines with the ground, thereby avoiding any ground gouging or the like.

The end panels 54 have the lower forward and rear corner portions thereof relieved or cut on an angle to avoid unintentional ground engagement.

A pair of opposed end panels 89 are fixed to and depend from the opposed transverse ends of the deck 38. These end panels, with a similarly mounted front panel 110 and rear panel 126, define a protective housing. Each end panel 89 mounts forward and rear adjustable ground engaging wheels 90 which ride along the ground and position the deck and clearing unit at the desired height relative to the ground during operation. Any ground irregularities encountered by the wheels 90 will be accommodated by the spring mounts 40.

Figure 7:
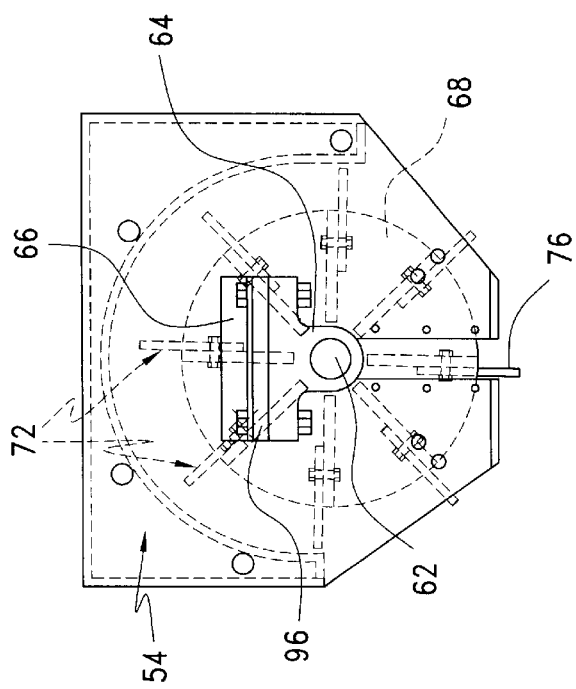
FIG. 7 is a similar side elevational detail with the clearing unit positioned for ground scarifying.
Figure 6:
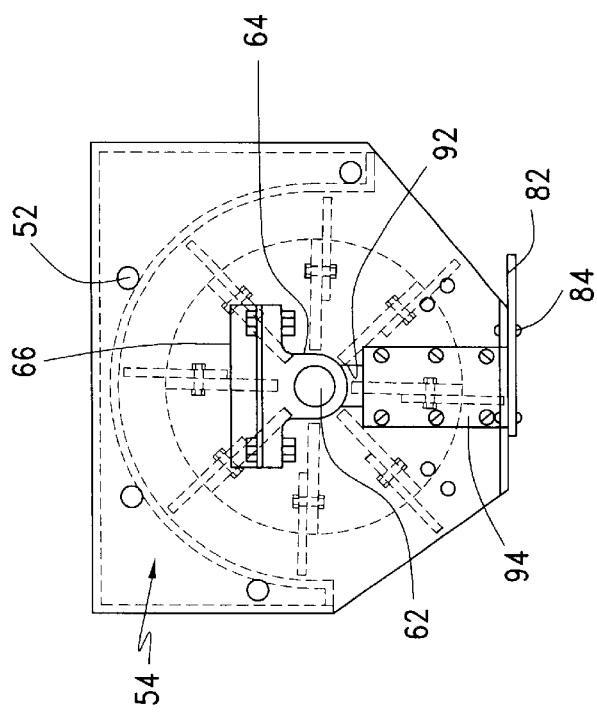
FIG. 6 is a side elevational detail illustrating the clearing unit for ground clearing.

Turning now to FIGS. 6 and 7, it will be noted that each of the end panels 54 includes a vertical slot 92 therein radially below the shaft 62 and extending through the bottom of the panel 54. These slots 92 are selectively covered by removable plates 94 bolted to the end panels 54. Upon a removal of the plates 94, and an unbolting of the shaft bearings from the angle supports 66, the entire operating unit can be dropped out of the drum for cleaning, blade replacement, or other required maintenance. In addition, and noting in particular FIG. 7, with the plate 94 removed, the shaft and bearings can be slightly lowered by the insertion of an appropriates shin 96 between the bearings and the support brackets 66 to lower the tines sufficiently so as to directly engage the ground surface, this of course necessitating the removal of the strike plate 82. Such an arrangement would be utilized when a specific scarifying of the ground is desired, primarily for reseeding purposes, as opposed to debris removal.

The shaft 62 of the cleaning unit is belt driven in an appropriate manner utilizing a motor 98 mounted on the deck with the motor drive pulley 100 belt driving a driven pulley 102 on the shaft 62 outward of the corresponding side panel 54 and within the adjacent deck end panel 89.

In order to gather the cut cores and other debris toward the operating unit, a pair of elongate forwardly diverging gathering arms 104 are mounted forward of and aligned with the intake portion 86. These arms are mounted to raise and lower in conjunction with the raising and lowering of the support frame from a lower operating position wherein the arms are positioned to engage and direct the debris, to a raised position wherein the arms allow for free travel of the apparatus. This adjustment of the arms can be provided for in a variety of ways. As illustrated the rear end portions of the arms 104 can be mounted by vertically adjustable bolts 106 engaged between a forwardly directed horizontal flange 108 on the front housing panel 110 depending from the deck 38. The adjustable bolts 106 will, through a lower bracket 112, be pivotally pinned to the arms 104. Forward thereof, the arms 104 will be adjustably supported by a pair of chains 114, the upper ends of which engage a forwardly extending bracket 116 mounted on the front frame beam 20 of the support frame. The lower ends of the chains engage a pair of vertical brackets 118 on the arms, the arms at this point, or more particularly the brackets 118, are cross braced by a transverse beam 120 to stabilize the lateral position of the arms relative to each other.

Figure 2:
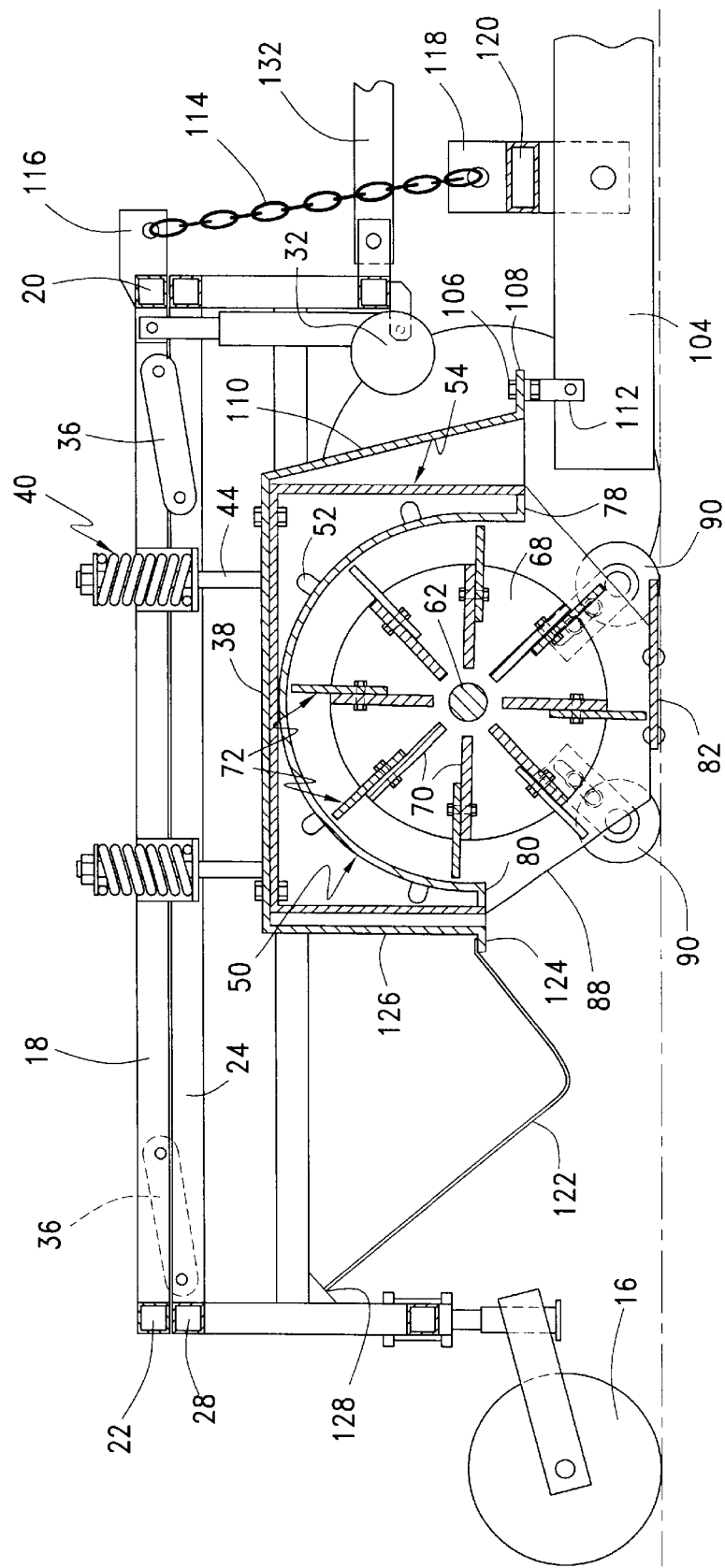
FIG. 2 is a longitudinal cross-sectional view through the machine.
Figure 3:
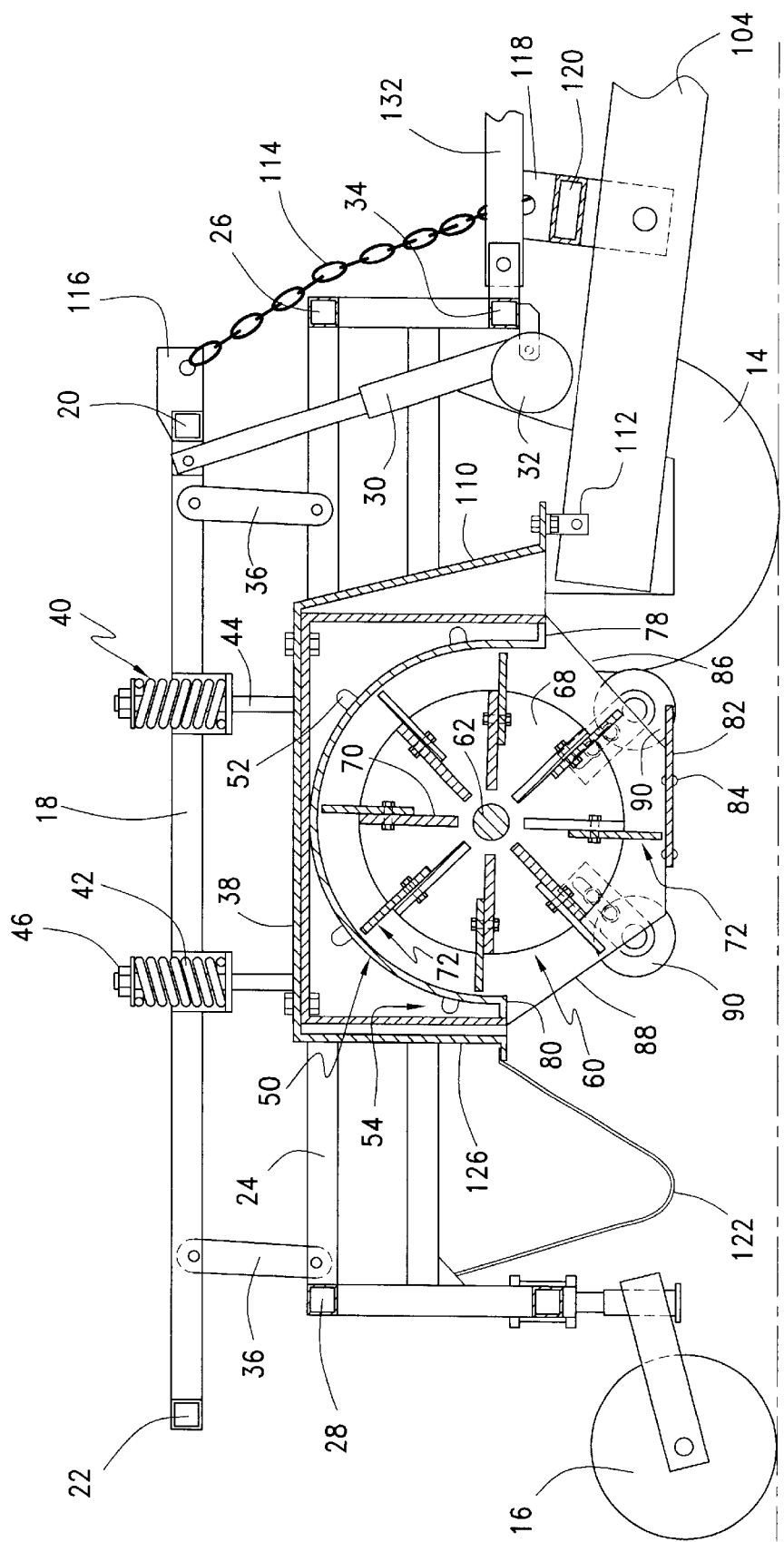
FIG. 3 is a longitudinal cross-sectional view similar to FIG. 2 with the machine in its raised transport position.

Noting FIGS. 2 and 3 in particular, the apparatus immediately rearward of the discharge portion 88 of the operating unit, is preferably provided with a flexible deflector shield 122 which has a forward edge mounted to a laterally directed flange 124 on the rear housing panel 126 depending from the top deck 38. The shield 122 extends in a hanging loop therefrom to engagement with the rear of the mobile frame as at 128. This shield 122 extends the full length of the operating unit so as to control and direct the discharging pulverized material back to the ground.

It is particularly intended that the ground clearing machine be positioned laterally to one side of the towing vehicle, schematically illustrated at 130 in FIG. 1, to avoid any compacting of the cut cores or other debris prior to engagement by the clearing machine. Pursuant thereto, and as one example of an appropriate hitching arrangement, an elongate tow bar 132 has a first end mounted to the lower frame beam 34 of the mobile frame for a vertical pivoting of the bar 132 about a horizontal axis as at 134. A transversely extending second beam 136 has a first end thereof mounted, as at 138, to the towing vehicle for pivotal movement about a horizontal axis. The beams 132 and 136 in turn are pivotally joined, as at 140, to allow for relative movement therebetween to accommodate vertical shifting of the clearing machine 10 relative to the tow vehicle 130 to accommodate any variations in ground levels as may occur between the two vehicles while at the same time providing for a positive transfer of the towing force to the towed vehicle.

The rear of the ground clearing machine will also be stabilized relative to the laterally positioned towing vehicle 130 by a rear bar 144 pivotally fixed at one end, as at 146, to the tow vehicle 130, and at the other end to the housing of the near caster wheel assembly 16, as at 148.

In operation, as the ground clearing machine is forwardly towed over an area to be worked, the shaft mounted blades rotate forwardly and upwardly along the direction of travel engaging and upwardly propelling the debris, inwardly gathered by the gathering arms. The debris, engaged by the rigid tines and the cylindrical inner surface of the drum in close proximity thereto is effectively pulverized, turning into a fine dust which is blown out of the discharge portion of the lower mouth of the drum rearward of the strike plate for deposit back on the ground surface. In this manner, the soil is reclaimed along with such nutrients, fertilizer, and the like which is a part thereof. The vertical adjustment of the operating unit provided for by the vertically adjustable support frame adapts the apparatus for use under varying ground conditions. In other words, the apparatus is equally adapted for use not only on close mown greens, but also on both fairways and roughs, with the height of the clearing element being appropriately set for conditions to be encountered. The spring mounting of the deck which supports the clearing implement allows for accommodation of minor ground irregularities sensed by the implement support wheels. The lateral positioning of the clearing apparatus, in conjunction with the pivotal hitch assemblies, both removes the tow vehicle from the path of travel of the apparatus to avoid any unnecessary ground impaction, and also allows for a floating action of the apparatus to accommodate variations in ground level between the tow vehicle and the ground clearing apparatus.

It is contemplated that the shaft and blades mounted thereon rotate at 4000 revolutions per minute or greater, thus ensuring a complete pulverization of the debris with the resultant fine powder forcibly discharging from the discharge portion of the drum mouth rearward of the vehicle. As indicated, an appropriate deflector shield can be provided to assist in downwardly directing and settling this powder back on the ground, filling the core holes and otherwise providing for a smoothly groomed surface.

While a specific embodiment of the invention has been illustrated, the invention is not to be taken as limited to all of the details thereof as modifications and variations may be made without departing from the spirit or scope of the invention as presented in the claims hereinafter.

What is claimed is:

1. A ground clearing machine comprising a ground engaging mobile frame adapted for forward movement along a determined path of travel on a ground surface for the clearing of the surface, a support frame, means mounting said support frame on said mobile frame for vertical adjustment relative to said mobile frame and the ground, means for moving said support frame to vertically adjusted positions relative to said mobile frame and releasably fixing said support frame in said adjusted positions, a power driven clearing implement for engaging, lifting, pulverizing and redistributing ground debris, said implement being mounted on said support frame for vertical adjustment therewith between a raised transport position and selected lower debris gathering positions, said clearing implement comprising a hollow drum positioned on said frame transversely of the path of travel, said drum having a semi-cylindrical inner wall, a pair of parallel side panels mounting said drum therebetween, aligned bearing means on said panels receiving and rotatable mounting said shaft, and means for vertically adjusting said bearing means and said shaft relative to said side panels, an elongate rotatable shaft extending through said drum coaxially with said wall, a plurality of spaced rigid blades mounted on and along the length of said shaft and at circumferentially spaced points thereabout, said blades having outer ends proximate said wall, said drum having a debris passing mouth extending axially therealong and opening downwardly forwardly along the path of travel substantially at the ground surface, said blades, upon rotation of said shaft, moving across said mouth and inducing a forward and upward flow of debris into and about said drum for pulverization of the debris as said machine moves along said path of travel.

2. The machine of claim 1 wherein said mouth also opens rearwardly along the path of travel for discharge of pulverized material from said mouth.

3. The machine of claim 2 wherein said drum extends circumferentially about a major portion of said clearing implement from a leading mouth-defining edge at a first vertical height relative to ground level to a second mouth-defining following edge at a second greater height relative to ground level.

4. The machine of claim 3 including a strike plate removably mounted axially across said mouth immediately below said blades with a forward edge of said strike plate below and parallel to the leading edge of the drum and spaced slightly rearward thereof to define an intake portion of said mouth for ground debris.

5. The machine of claim 4, said strike plate having a rear edge below and generally parallel to the following edge of said drum and spaced forwardly thereof to define a discharge portion of said mouth.

6. The machine of claim 1 wherein said side panels include removable plates therein vertically aligned with and below said bearing means and said shaft to allow for a selective downward removal of said shaft and mounted blades from said drum.

7. The machine of claim 6 including a support deck, spring means mounting said deck on said support frame for controlled floating movement relative thereto, said deck mounting and supporting said clearing implement.

8. The machine of claim 7 including ground engaging rollers mounted to and depending from said support deck for defining a fixed vertical relationship between the ground and the implement whereby ground level variations will be followed by said rollers and accommodated by the controlled floating movement of said deck.

9. The machine of claim 8 including means mounting said rollers for a fixed positioning thereof.

10. The machine of claim 9 wherein the means mounting said support frame on said mobile frame comprises a plurality of spaced parallel equal length links having first ends pivotally joined to said mobile frame and second ends pivotally joined to said support frame, said means for moving said support frame comprising a selectively extensible and retractable power member engaged between said mobile frame and said support frame for a vertical movement of said support frame relative to and parallel to said mobile frame.

11. The machine of claim 10 including tow bar means pivotally mounted to said mobile frame and extending laterally therefrom for engagement with a laterally positioned tow vehicle, said tow bar means including pivotally joined components including a first tow bar having a first end pivotally joined to said mobile frame and a second forward end, and a second laterally extending tow bar having a first end adapted for pivotal mounting to the tow vehicle, and a second end pivotally joined to said second end of first tow bar.

12. The machine of claim 11 including a pair of laterally spaced forwardly diverging gathering arms mounted to said support frame for vertical adjustment therewith, said gathering arms having rear ends aligned with and positioned closely adjacent said intake portion of said drum mouth, and forward ends forwardly remote therefrom, said gathering arms being vertically adjustable with said support frame.

13. The machine of claim 4 wherein said blades each include multiple laterally spaced tines, said blades being aligned in rows along said shaft, said rows being circumferentially spaced from each other about said shaft, said tines in each row of blades being laterally offset from the tines in adjacent rows of blades.

14. The machine of claim 13 including a deflector shield positioned rearward of said discharge portion of said mouth of the drum for engagement and deflection of discharge therefrom.

15. A ground clearing machine comprising a ground engaging mobile frame adapted for forward movement along a path of travel on a ground surface, a power driven clearing implement for engaging, lifting, pulverizing and redistributing ground debris, said implement being mounted on said frame and comprising a hollow drum positioned transversely of said path of travel, said drum having a semi-cylindrical inner wall, an elongate rotatable shaft extending through said drum coaxial with said wall, a pair of parallel side panels mounting said drum therebetween, aligned bearing means on said panels receiving and rotatable mounting said shaft, and means for vertically adjusting said bearing means and said shaft relative to said side panels, a plurality of spaced rigid blades mounted on and along the length of said shaft and at circumferentially spaced points thereabout, said blades having outer ends proximate said wall, said drum having a debris passing mouth extending axially therealong and opening downward forward along the path of travel substantially at ground level, said blades, upon rotation of said shaft, moving across said mouth and inducing a forward and upward flow of debris into and about said drum for pulverization of the debris as said machine moves along said path of travel, said mouth also opening rearwardly along the path of travel for discharge of pulverized debris from said mouth.

16. The machine of claim 15 wherein said drum extends circumferentially about a major portion of said clearing implement from a leading mouth-defining edge at a first vertical height relative to ground level to a second mouth-defining following edge at a second greater height relative to ground level, and a ground engaging strike plate removably mounted axially across said mouth immediately below said blades with a forward edge of said strike plate below and parallel to the leading edge of the drum and spaced slightly rearward thereof to define an intake portion of said mouth for ground debris, said strike plate having a rear edge below and generally parallel to the following edge of said drum and spaced forwardly thereof to define a discharge portion of said mouth.

17. The machine of claim 16 including a support frame, means mounting said support frame on said mobile frame for vertical adjustment relative thereto, said support frame mounting said clearing implement on said mobile frame for vertical adjustment of said clearing implement with said support frame.

18. The machine of claim 17 including a deck, spring means mounting said deck on said support frame for a controlled floating movement of said deck relative to said support frame, said clearing implement being fixed to said deck for controlled movement therewith, and ground engaging rollers mounted to and depending below said deck for defining a fixed vertical relationship between the ground and the clearing implement whereby ground level variations will be followed by said rollers and accommodated by the controlled floating movement of said deck.

* * * * *